United States Patent
Lentini

(10) Patent No.: US 9,544,243 B2
(45) Date of Patent: *Jan. 10, 2017

(54) SYSTEM AND METHOD FOR A SHARED WRITE ADDRESS PROTOCOL OVER A REMOTE DIRECT MEMORY ACCESS CONNECTION

(71) Applicant: NetApp, Inc., Sunnyvale, CA (US)

(72) Inventor: James Lentini, Woburn, MA (US)

(73) Assignee: NetApp, Inc., Sunnyvale, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 14/230,861

(22) Filed: Mar. 31, 2014

(65) Prior Publication Data

US 2014/0214998 A1    Jul. 31, 2014

Related U.S. Application Data

(63) Continuation of application No. 12/418,180, filed on Apr. 3, 2009, now Pat. No. 8,688,798.

(51) Int. Cl.
| | | |
|---|---|---|
| *G06F 15/16* | (2006.01) | |
| *H04L 12/911* | (2013.01) | |
| *H04L 29/08* | (2006.01) | |

(52) U.S. Cl.
CPC ........... *H04L 47/70* (2013.01); *H04L 67/1097* (2013.01)

(58) Field of Classification Search
USPC ........................................................ 709/217
See application file for complete search history.

(56) References Cited

U.S. PATENT DOCUMENTS

| 4,937,763 A | 6/1990 | Mott |
|---|---|---|
| 5,067,099 A | 11/1991 | McCown et al. |
| (Continued) | | |

FOREIGN PATENT DOCUMENTS

| EP | 04 01 6755 | 11/2004 |
|---|---|---|
| WO | WO 99/59064 | 11/1999 |
| WO | WO 01/35244 | 5/2001 |

OTHER PUBLICATIONS

"Predefined"—definition from dictionary.com, Webster's Revised Unabridged Dictionary (c) 1996, 1998 MICRA, Inc. http://dictionary.reference.com/browse/predefine, 3 pages.

(Continued)

*Primary Examiner* — Alicia Baturay
(74) *Attorney, Agent, or Firm* — LeClairRyan, a Professional Corporation

(57) ABSTRACT

The present invention provides a system and method for a shared write address protocol (SWAP) that is implemented over a remote direct memory address (RDMA) connection. Each party to a connection establishes a flow control block that is accessible to its partner via a RDMA READ operation. The novel protocol operates so that each module needs to have one outstanding RDMA READ operation at a time, i.e., to obtain the current flow control information from its partner. In operation, if data to be transmitted is less than or equal to a buffer size, an INLINE message data structure of the SWAP protocol is utilized to send the data to be target. However, if the data is greater than the buffer size, a second determination is made as to whether sufficient space exists in the message pool for the data. If insufficient space exists, the sender will wait until sufficient space exists before utilizing a novel WRITE operation of the SWAP protocol to transmit the data.

12 Claims, 16 Drawing Sheets

(56) References Cited

U.S. PATENT DOCUMENTS

| | | |
|---|---|---|
| 5,157,663 A | 10/1992 | Major et al. |
| 5,163,131 A | 11/1992 | Row et al. |
| 5,355,453 A | 10/1994 | Row et al. |
| 5,485,579 A | 1/1996 | Hitz et al. |
| 5,633,999 A | 5/1997 | Clowes et al. |
| 5,680,580 A | 10/1997 | Beardsley et al. |
| 5,781,770 A | 7/1998 | Byers et al. |
| 5,802,366 A | 9/1998 | Row et al. |
| 5,812,748 A | 9/1998 | Ohran et al. |
| 5,812,751 A | 9/1998 | Ekrot et al. |
| 5,819,292 A | 10/1998 | Hitz et al. |
| 5,931,918 A | 8/1999 | Row et al. |
| 5,941,972 A | 8/1999 | Hoese et al. |
| 5,948,110 A | 9/1999 | Hitz et al. |
| 5,950,225 A | 9/1999 | Kleiman et al. |
| 5,951,695 A | 9/1999 | Kolovson |
| 5,963,962 A | 10/1999 | Hitz et al. |
| 5,964,886 A | 10/1999 | Slaughter et al. |
| 5,991,797 A | 11/1999 | Futral et al. |
| 6,038,570 A | 3/2000 | Hitz et al. |
| 6,065,037 A | 5/2000 | Hitz et al. |
| 6,119,244 A | 9/2000 | Schoenthal et al. |
| 6,138,126 A | 10/2000 | Hitz et al. |
| 6,161,191 A | 12/2000 | Slaughter et al. |
| 6,173,413 B1 | 1/2001 | Slaughter et al. |
| 6,289,356 B1 | 9/2001 | Hitz et al. |
| 6,292,905 B1 | 9/2001 | Wallach et al. |
| 6,347,337 B1 | 2/2002 | Shah et al. |
| 6,421,787 B1 | 7/2002 | Slaughter et al. |
| 6,425,035 B2 | 7/2002 | Hoese et al. |
| 6,460,080 B1 | 10/2002 | Shah et al. |
| 6,542,924 B1 | 4/2003 | Abe |
| 6,611,883 B1* | 8/2003 | Avery .................. G06F 13/28 709/213 |
| 6,625,749 B1 | 9/2003 | Quach |
| 6,671,773 B2 | 12/2003 | Kazar et al. |
| 6,675,200 B1 | 1/2004 | Cheriton et al. |
| 6,728,897 B1 | 4/2004 | Cramer et al. |
| 6,742,051 B1 | 5/2004 | Bakshi et al. |
| 6,747,949 B1 | 6/2004 | Futral |
| 6,760,304 B2 | 7/2004 | Uzrad-Nali et al. |
| 6,799,220 B1 | 9/2004 | Merritt et al. |
| 6,839,896 B2* | 1/2005 | Coffman ............... G06F 9/4443 719/310 |
| 6,888,792 B2 | 5/2005 | Gronke |
| 6,920,579 B1 | 7/2005 | Cramer et al. |
| 6,922,408 B2* | 7/2005 | Bloch .................. H04L 12/4604 370/389 |
| 6,950,833 B2 | 9/2005 | Costello et al. |
| 6,952,792 B2 | 10/2005 | Emberty et al. |
| 7,055,133 B2 | 5/2006 | Plummer et al. |
| 7,069,295 B2 | 6/2006 | Sutherland et al. |
| 7,069,465 B2 | 6/2006 | Chu et al. |
| 7,143,176 B2 | 11/2006 | Gluck et al. |
| 7,184,445 B2 | 2/2007 | Gupta et al. |
| 7,213,045 B2 | 5/2007 | Uzrad-Nali et al. |
| 7,299,266 B2 | 11/2007 | Boyd et al. |
| 7,376,755 B2 | 5/2008 | Pandya |
| 7,409,494 B2 | 8/2008 | Edwards et al. |
| 7,430,615 B2* | 9/2008 | Blackmore ......... H04L 67/1097 709/214 |
| 2003/0061296 A1* | 3/2003 | Craddock ............... H04L 29/06 709/212 |
| 2003/0115350 A1 | 6/2003 | Uzrad-Nali et al. |
| 2004/0010545 A1 | 1/2004 | Pandya |
| 2004/0030668 A1 | 2/2004 | Pawlowski et al. |
| 2004/0174814 A1 | 9/2004 | Futral |
| 2004/0268017 A1 | 12/2004 | Uzrad-Nali et al. |
| 2006/0047771 A1 | 3/2006 | Blackmore et al. |
| 2006/0075057 A1* | 4/2006 | Gildea ................ H04L 67/1097 709/212 |

OTHER PUBLICATIONS

David Hitz et al. TR3002 File System Design for a NFS File Server Appliance published by Network Appliance, Inc., htt://www.netapp.com/tech_library/3002.print, Jul. 9, 2001, 10 pages.

Virtual Interface Architecture Specification, Version 1.0, , published by a collaboration between Compaq Computer Corp., Intel Corp., and Microsoft Corp., Dec. 1997, 83 pages.

Fielding et al. "Hypertext Transfer Protocol—HTTP/1.1", Request for Comments (RFC) 2616, Jun. 1999, 143 pages.

Common Internet File System (CIFS) Version: CIFS—Spec 0.9, Storage Networking Industry Association (SNIA), Draft SNIA CIFS Documentation Work Group Work-in-Progress, Revision Date: Mar. 26, 2001, 126 pages.

NCI TS 332—Fibre Channel Arbitrated Loop (FC-AL-2) published by the American National Standards Institute, New York, NY, 1999, 149 pages.

\* cited by examiner

SYSTEM AND METHOD FOR A SHARED WRITE ADDRESS PROTOCOL OVER A REMOTE DIRECT MEMORY ACCESS CONNECTION

RELATED APPLICATION

The present application is a continuation of U.S. patent application Ser. No. 12/418,180, entitled "SYSTEM AND METHOD FOR A SHARED WRITE ADDRESS PROTOCOL OVER A REMOTE DIRECT MEMORY ACCESS CONNECTION," filed on Apr. 3, 2009 by James Lentini, the contents of which are incorporated by reference herein in their entirety.

FIELD OF THE INVENTION

The present invention relates to network communication channels and, more specifically, to the use of remote direct memory access (RDMA) operations over network communication channels.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD). Storage devices may also comprise solid state devices, such as flash memory, battery backed up non-volatile ramdom access memory, etc. As such, the description of storage devices being disks should be taken as exemplary only.

The storage operating system of the storage system may implement a high-level module, such as a file system, to logically organize the information stored on volumes as a hierarchical structure of data containers, such as files and logical unit numbers (luns). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

To enable high performance communications among storage systems, a plurality of storage systems may be organized as nodes of a cluster that is configured to implement distributed operations to increase overall bandwidth. Intra-cluster communications typically require high-performance communication pathways. An example of such pathways that cluster node members may utilize is remote direct memory access (RDMA) networks to enable high-performance communications. Typically, RDMA networks use network protocol offloads and/or direct access interfaces to reduce the load on a main processor of a cluster member. To achieve network protocol offload, an RDMA compatible network adapter typically implements network protocol processing up to and including the transport layer. Offloading protocol processing from the cluster member's main processor provides additional compute cycles for other tasks.

In addition to its protocol offload capabilities, an RDMA compatible network adapter may provide direct access interface to applications via specialized hardware and/or operating system coordination. As part of its direct access interface, the RDMA compatible network adapter typically provides a plurality of communication primitives, e.g., RDMA READ and RDMA WRITE operations. An RDMA READ operation requests that a data buffer on a target node (e.g., a remote cluster member) be transferred (or read) into a local destination buffer of a source node (e.g., a local cluster member). That is, an RDMA READ operation causes data stored in a defined memory region, i.e., a buffer, on the target node to be transferred to a buffer that is allocated on the source node, i.e., the node that originated the RDMA READ operation. An RDMA WRITE operation transfers a local data buffer to a remote destination buffer.

In a typical implementation, an RDMA READ operation consumes more resources and is slower than an RDMA write operation. Unlike RDMA WRITE operations, RDMA READ operations require dedicated resources on the RDMA hardware of the target and source node when transferring the data into the local destination buffer. If not managed appropriately, consumption of such resources may adversely impact (e.g., throttle) RDMA operations. For this reason, typical RDMA network adapters limit the number of RDMA READ operations that can be issued in parallel on a single connection, i.e., the total number of such operations that may be outstanding at any time. For example, RDMA adapters typically only allow a small number of RDMA READ operations to be outstanding at a time compared to the number of outstanding RDMA WRITE operations that may be outstanding at a time. RDMA READ operations are also typically slower than RDMA WRITE operations because they typically require a transaction on the target system's I/O bus (e.g., the PCI bus, PCI-X bus, PCI Express bus, etc.) before the target's RDMA adapter can send an acknowledgement completing the RDMA READ operation. As will be appreciated by one skilled in the art, this presents a challenge to data access protocols that rely on RDMA READ operations, as those protocols must use RDMA READ operations sparingly to avoid being throttled due to RDMA hardware limitations.

SUMMARY OF THE INVENTION

The present invention overcomes the disadvantages of the prior art by providing a system and method for a shared write address protocol (SWAP) that is implemented over a remote direct memory address (RDMA) connection. The system and method enables the optimized utilization of the limited number of READ operations typically imposed by RDMA hardware environments. After the connection is established between two partner modules, e.g., a network element (network module) or disk element (data module), within a cluster utilizing a conventional RDMA transport protocol, each of the modules transmits a novel HELLO message to its partner. The HELLO message is utilized by each module to convey appropriate flow control information using a flow control data structure that is accessible to its partner via a RDMA READ operation. The novel protocol operates so that each module has one outstanding RDMA READ operation at a time, i.e., to obtain the current flow control information from its partner.

When a module receives data to be transmitted to its partner module over the RDMA connection, a determination is made whether the received data is less than or equal to a defined buffer size. The buffer size is illustratively defined in the initial HELLO messages exchanged between modules. If the data to be transmitted is less than or equal to the buffer size an INLINE message data structure of the SWAP protocol is utilized to send the data to the partner. However, if the data is greater than the buffer size, a second determination is made as to whether sufficient space exists in a message pool for the data. If insufficient space exists, the transmitting module waits until sufficient space exists before utilizing a novel WRITE operation of the SWAP protocol to transmit the data. By utilizing the principles of the present invention, the use of RDMA READ requests is limited to a single outstanding RDMA READ request to obtain flow control information from the module's partner, thereby obviating the need for having a plurality of outstanding RDMA READ operations for a single connection at a single time.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
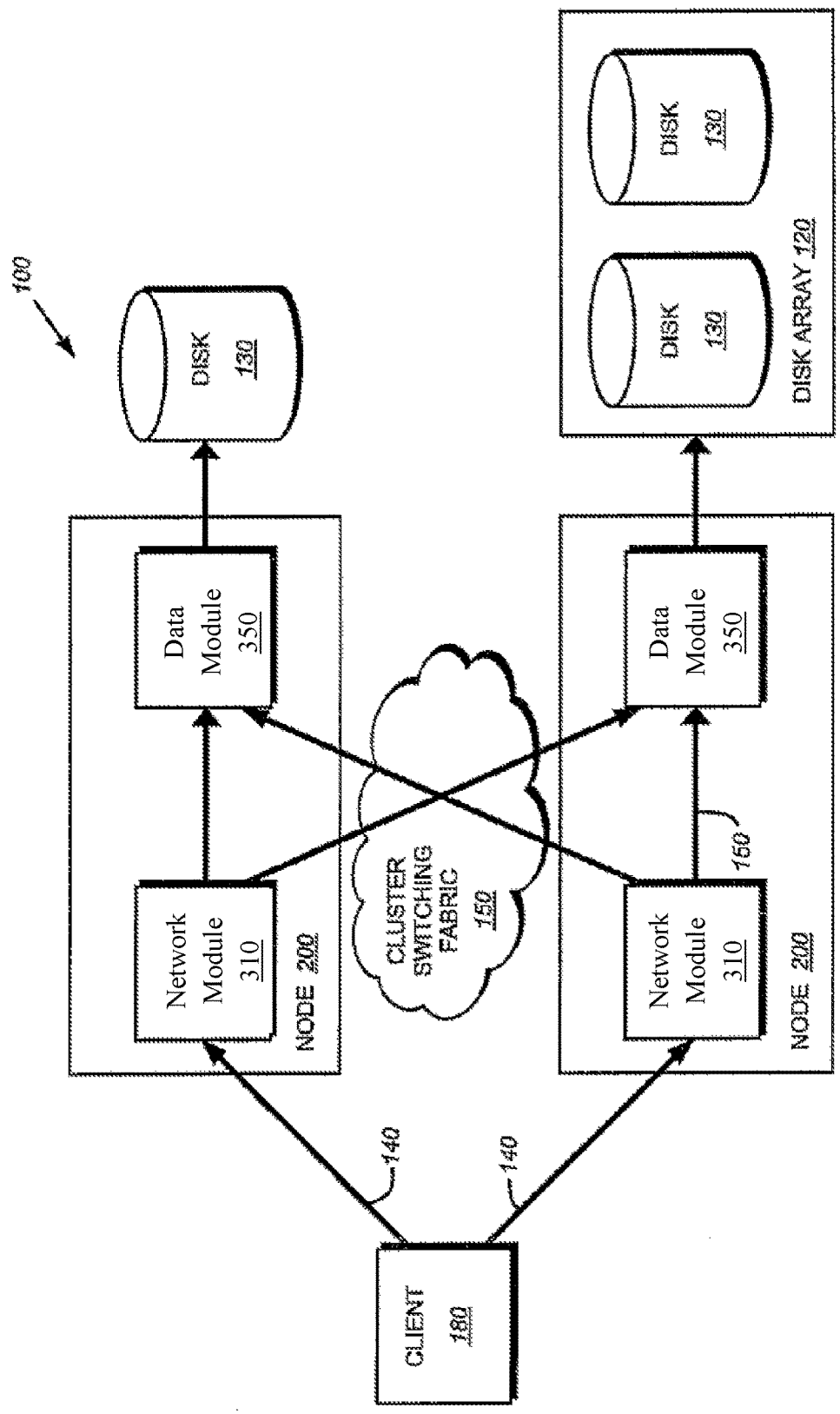
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices in accordance with an illustrative embodiment of the present invention. The nodes 200 comprise various functional components that cooperate to provide a distributed storage system architecture of the cluster 100. To that end, each node 200 is generally organized as a network element (module 310) and a disk element (data module 350). The network module 310 includes functionality that enables the node 200 to connect to clients 180 over a computer network 140, while each data module 350 connects to one or more storage devices, such as disks 130 of a disk array 120. It should be noted that while an illustrative embodiment is described using disks 130 of a disk array 120, in alternative embodiments any storage device, e.g., solid state storage devices, Flash memory, etc. may be utilized. As such, the description of disks and disk arrays should be taken as exemplary only. The nodes 200 are interconnected by a cluster switching fabric 150 which, in the illustrative embodiment, may be embodied as a Gigabit Ethernet switch, an InfiniBand switch, etc. An exemplary distributed file system architecture is generally described in U.S. Pat. No. 6,671,773, entitled METHOD AND SYSTEM FOR RESPONDING TO FILE SYSTEM REQUESTS, by M. Kazar et al.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. It should be noted that in alternative embodiments, additional and/or differing protocols may be utilized without departing from the spirit or scope of the present invention. As such, the description of the various file and/or block-based protocols should be taken as exemplary only.

B. Storage System Node

Figure 2:
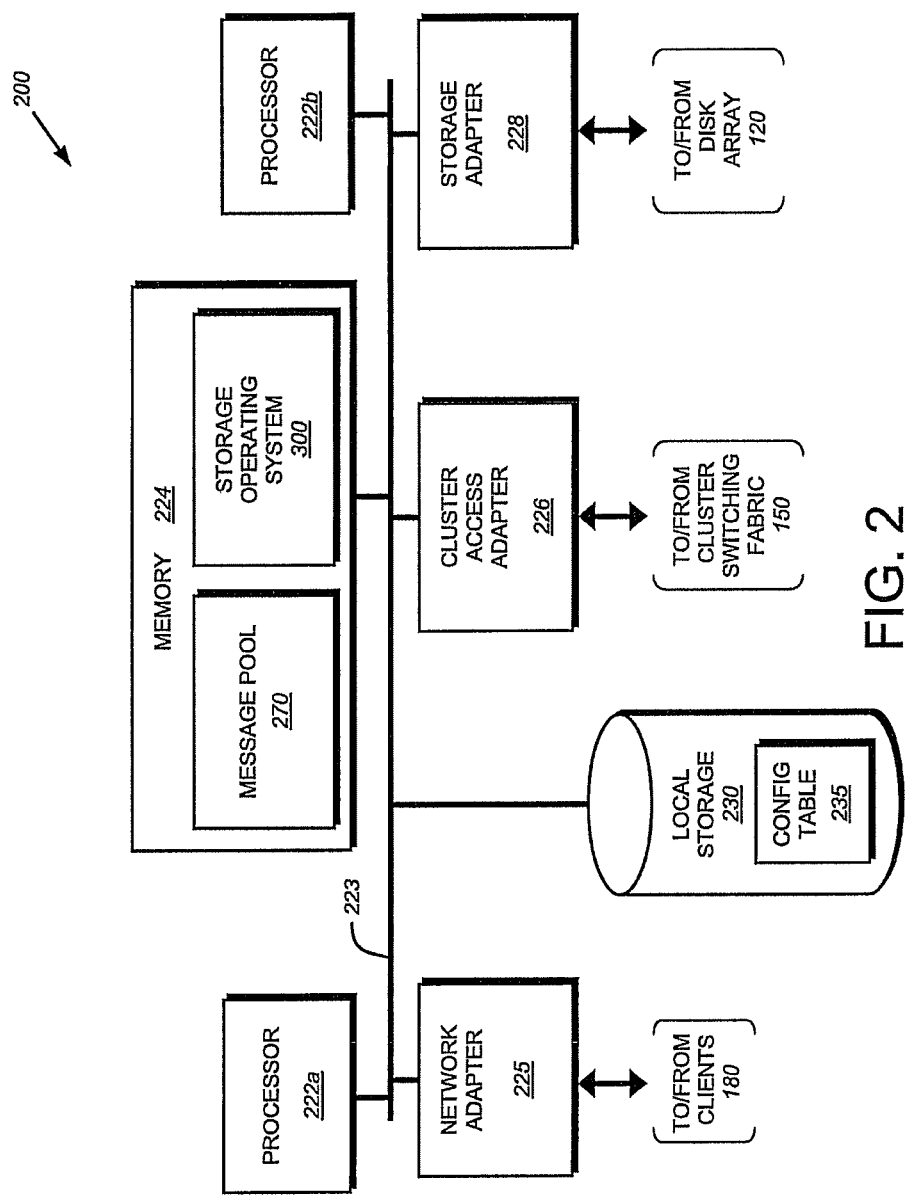
FIG. 2 is a schematic block diagram of a node of a cluster in accordance with an illustrative embodiment of the present invention.

FIG. 2 is a schematic block diagram of a node 200 that is illustratively embodied as a storage system comprising a plurality of processors 222*a, b*, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management is processes that illustratively execute as applications 900 (see FIG. 9). The cluster access adapter 226 comprises a plurality of ports adapted to couple the node 200 to other nodes of the cluster 100. In the illustrative embodiment, InfiniBand and/or Ethernet is used as the clustering protocol and interconnect media, although it will be apparent to those skilled in the art that other types of protocols and interconnects may be utilized within the cluster architecture described herein. In an illustrative embodiment, the cluster access adapter 226 implements an RDMA compatible protocol for use with inter-node and/or inter-module communications. Thus, in alternative embodiments of the present invention, the cluster access adapter 226 may utilize any form of RDMA transport protocol, e.g., iWARP, Infini-Band, Fibre Channel, etc. In alternative embodiments where the network modules and data modules are implemented on separate storage systems or computers, the cluster access adapter 226 is utilized by the network and/or data module for communicating with other network and/or data modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222*a* executes the functions of the network module 310 on the node, while the other processor 222*b* executes the functions of the data module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. Message pool 270 is illustratively a reserved location in memory that is utilized for storing data to be transmitted to a partner using the novel shared write address protocol (SWAP) in accordance with an illustrative embodiment of the present invention. Message pool 270 and its use is described in further detail below.

The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program code (and/or instructions) pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. In illustrative embodiments, the network adapter 225 may comprise a RDMA adapter. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP. In alternative embodiments of the present invention, the novel SWAP protocol may be utilized for client-sever communications. As such, the description below of server-server communications should be taken as exemplary only.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical, solid state, flash and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
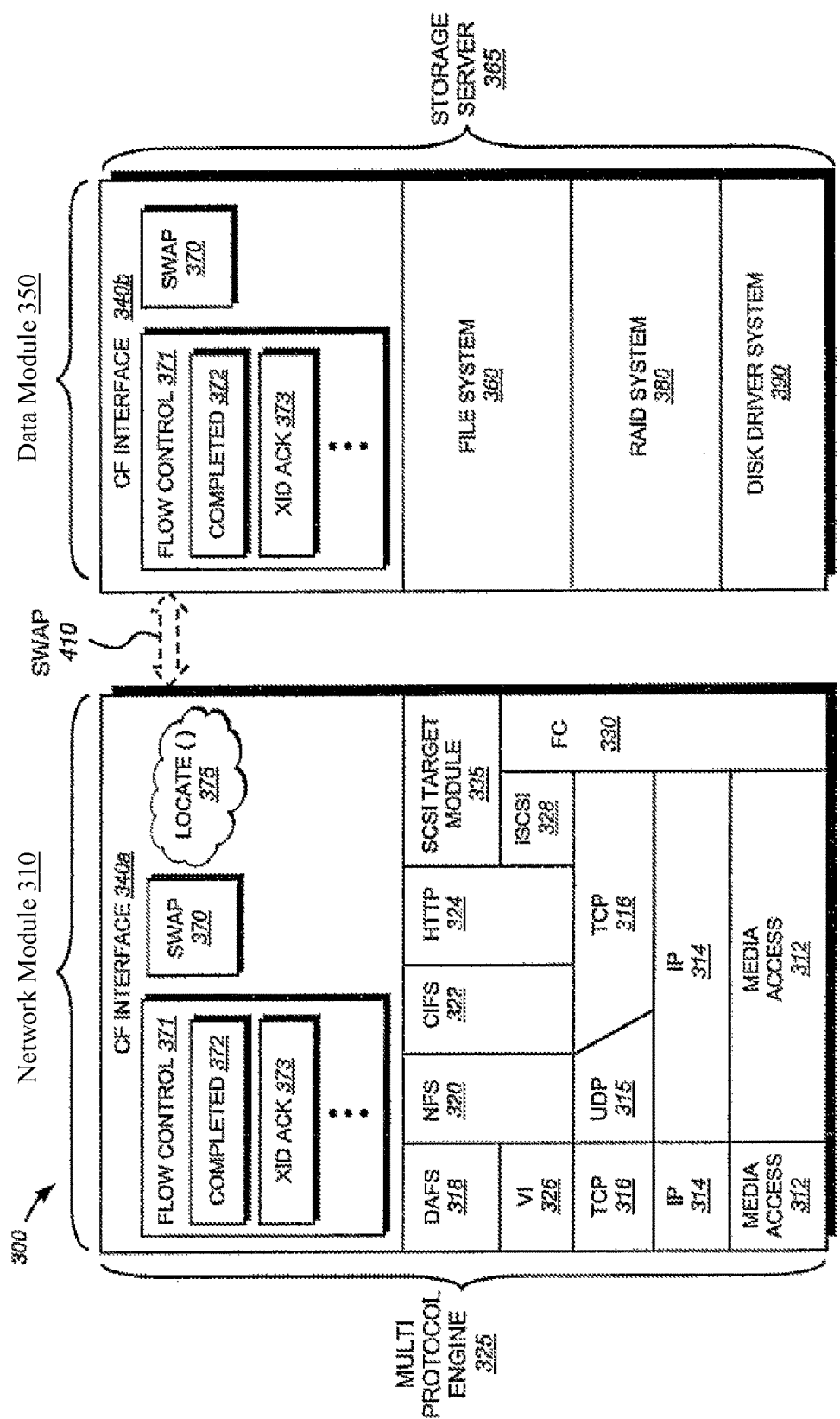
FIG. 3 is a schematic block diagram of a storage operating system that may be advantageously used in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of logical unit numbers (luns) to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 910 (see FIG. 9), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a data container, e.g., file, that includes all other inodes of the file system. Each logical volume (file system) has an fsinfo block within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding, via, for example, a Cluster Fabric (CF) interface 340, to the file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternative embodiment of the invention, a storage access request data path may be implemented as logic circuitry embodied within e.g., a field programmable gate array (FPGA) or an application specific integrated circuit (ASIC). This type of hardware implementation increases the performance of the storage service provided by node 200 in response to a request issued by client 180. Moreover, in another alternative embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

D. Cluster Fabric Communications

In the illustrative embodiment, the storage server 365 is embodied as data module 350 of the storage operating system 300 to service one or more volumes of array 120. In addition, the multi-protocol engine 325 is embodied as network module 310 to (i) perform protocol termination with respect to a client issuing incoming data access request packets over the network 140, as well as (ii) redirect those data access requests to any storage server 365 of the cluster 100. Moreover, the network module 310 and data module 350 cooperate is to provide a highly-scalable, distributed storage system architecture of the cluster 100. To that end, each module includes a cluster fabric (CF) interface module 340*a,b* adapted to implement intra-cluster communication among the modules.

The protocol layers, e.g., the NFS/CIFS layers and/or the iSCSI/FC layers, of the network module 310 function as protocol servers that translate file-based and/or block-based data access requests from clients into CF protocol messages used for communication with the data module 350. That is, the network module servers convert the incoming data access requests into file system primitive operations (commands) that are embedded within CF messages by the CF interface module 340 for transmission to the data module 350 of the cluster 100. Notably, the CF interface modules 340 cooperate to provide a single file system image across all data modules 350 in the cluster 100. Thus, any network port of an network module that receives a client request can access any data container within the single file system image located on any data module 350 of the cluster.

Further to the illustrative embodiment, the network module 310 and data module 350 are implemented as separately-scheduled processes of storage operating system 300; however, in an alternate embodiment, the modules may be implemented as pieces of code within a single operating system process. Communication between an network module and data module is thus illustratively effected through the use of message passing between the modules although, in the case of remote communication between an network module and data module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593, now U.S. Pat. No. 6,671,773 on Dec. 30, 2003. However, in an illustrative embodiment of the present invention, the CF protocol comprises the shared write address protocol (SWAP), described further below, that operates over a RDMA compatible transport layer.

The CF interface module 340 implements the CF protocol for communicating file system commands among the modules of cluster 100. Communication is illustratively effected by the data module exposing the CF API to which an network module (or another data module) issues calls. To that end, the CF interface module 340 is organized as a CF encoder and CF decoder. The CF encoder of, e.g., CF interface 340*a* on network module 310 encapsulates a CF message as (i) a local procedure call (LPC) when communicating a file system command to a data module 350 residing on the same node 200 or (ii) a remote procedure call (RPC) when communicating the command to a data module residing on a remote node of the cluster 100. In either case, the CF decoder of CF interface 340b on data module 350 de-encapsulates the CF message and processes the file system command.

Illustratively included within the CF interface module 340 is a shared write address protocol (SWAP) module 370 that implements the novel protocol of the present invention. It should be noted that in alternative embodiments of the present invention, the functionality of the shared write address protocol may be integrated directly into the CF module 340 or may be integrated into other modules of the storage operating system 300. As such, the description of the SWAP module 370 residing within the CF interface module 340 should be taken as exemplary only. In alternative embodiments the novel shared write address protocol may be implemented in non-CF environments. That is, the SWAP module 370 may be utilized on any computer system desirous to utilize an RDMA connection with another system. For example, a SWAP module 370 could be integrated into the multi-protocol engine 325 alongside VI 326, etc. Such an exemplary embodiment would allow client server environments to utilize the SWAP protocol.

Also illustratively located in the CF interface 340 is a flow control data structure (hereinafter "block") 371. The flow control block 371 illustratively includes a completed field 372 and a transaction ID (XID) acknowledgement field 373. The completed field is used to track the number of received operations that have been processed and reposted to the module's receive work queue (not shown). The XID acknowledgment field 373 stores the XID of the last response that has been processed by the module. This field 373 may be utilized to determine that all write buffers used by a request identified in the XID acknowledgement field 373 and all previous requests are no longer being utilized and are therefore available for the storage of the new data. That is, by determining which XIDs have been completed, the module may determine which portions of the message pool 270 are available for reuse.

In accordance with an illustrative embodiment of the present invention, maintenance of each flow control block is managed by the particular module on which is stored. Each module may utilize a RDMA READ operation to retrieve the contents of the flow control block and therefore identify the current status, i.e., those XIDs which have been processed, by its partner module. Similarly, by identifying the last XID processed, a module may then determine which regions of the message pool are free for reuse by new data.

E. File System Layout

Figure 4:
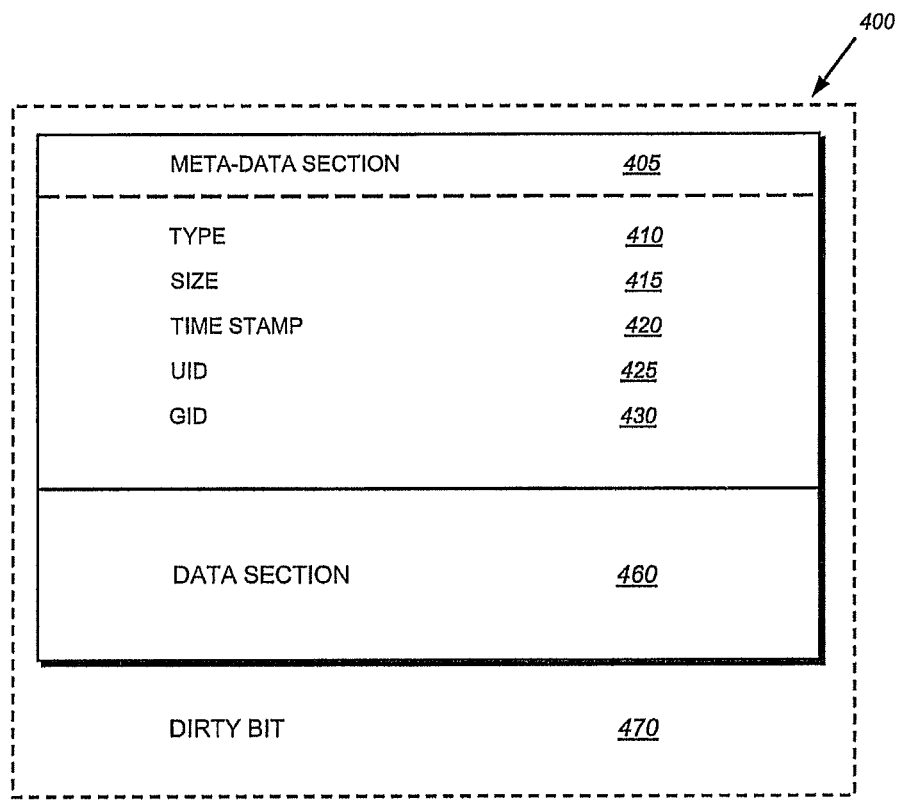
FIG. 4 is a schematic block diagram of an exemplary inode in accordance with an illustrative embodiment of the present invention.

In an illustrative embodiment of the present invention, a data container is represented in the write-anywhere file system as an inode data structure adapted for storage on the disks 130. FIG. 4 is a schematic block diagram of an inode 400, which preferably includes a metadata section 405 and a data section 460. The information stored in the metadata section 405 of each inode 400 describes the data container (e.g., a file) and, as such, includes the type (e.g., regular, directory, vdisk) 410 of file, its size 415, time stamps (e.g., access and/or modification time) 420 and ownership, i.e., user identifier (UID 425) and group ID (GID 430), of the file. The contents of the data section 460 of each inode may be interpreted differently depending upon the type of file (inode) defined within the type field 410. For example, the data section 460 of a directory inode contains metadata controlled by the file system, whereas the data section of a regular inode contains file system data. In this latter case, the data section 460 includes a representation of the data associated with the file.

Specifically, the data section 460 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 460 of the inode (e.g., a second level inode) references an indirect block (e.g., a first level L1 block) that contains 1024 pointers, each of which references a 4 KB data block on disk. For file system data having a size greater than 64 MB, each pointer in the data section 460 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 470 so that the inode (block) can be subsequently "flushed" (stored) to disk. The in-core and on-disk format structures of the WAFL file system, including the inodes and inode file, are disclosed and described in U.S. Pat. No. 5,818,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 5:
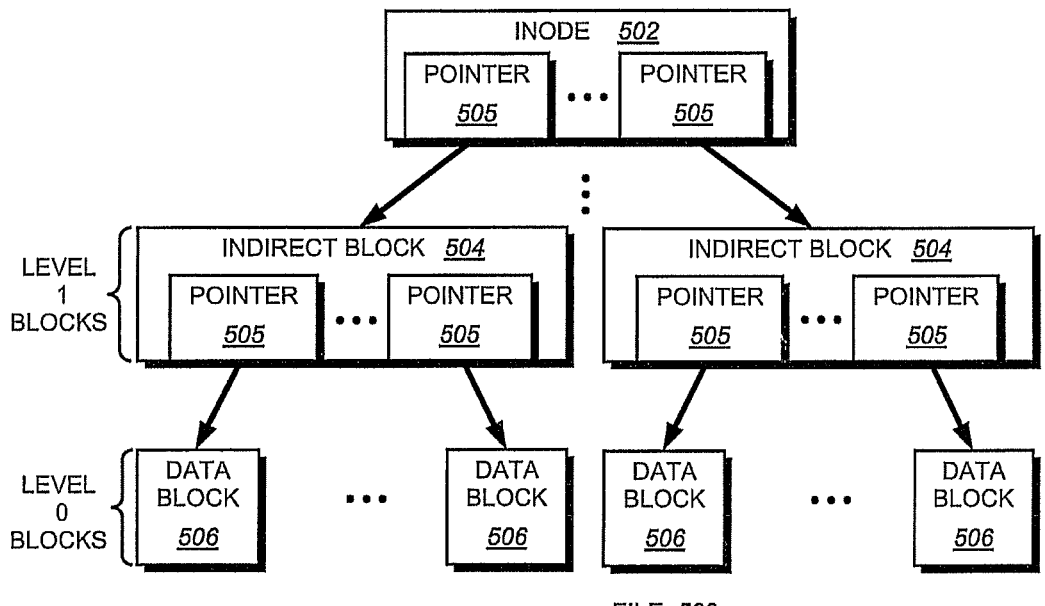
FIG. 5 is a schematic block diagram of an exemplary buffer tree in accordance with an illustrative embodiment of the present invention.

FIG. 5 is a schematic block diagram of an embodiment of a buffer tree of a file 500 that may be advantageously used with the present invention. The buffer tree is an internal representation of blocks for a file (e.g., file 500) loaded into the memory 224 and maintained by the file system 360. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 500 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al., now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains metadata, such as block allocation structures, within that pvbn space. Each flexible volume has its own virtual volume block number (vvbn) space and maintains metadata, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 500) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 6:
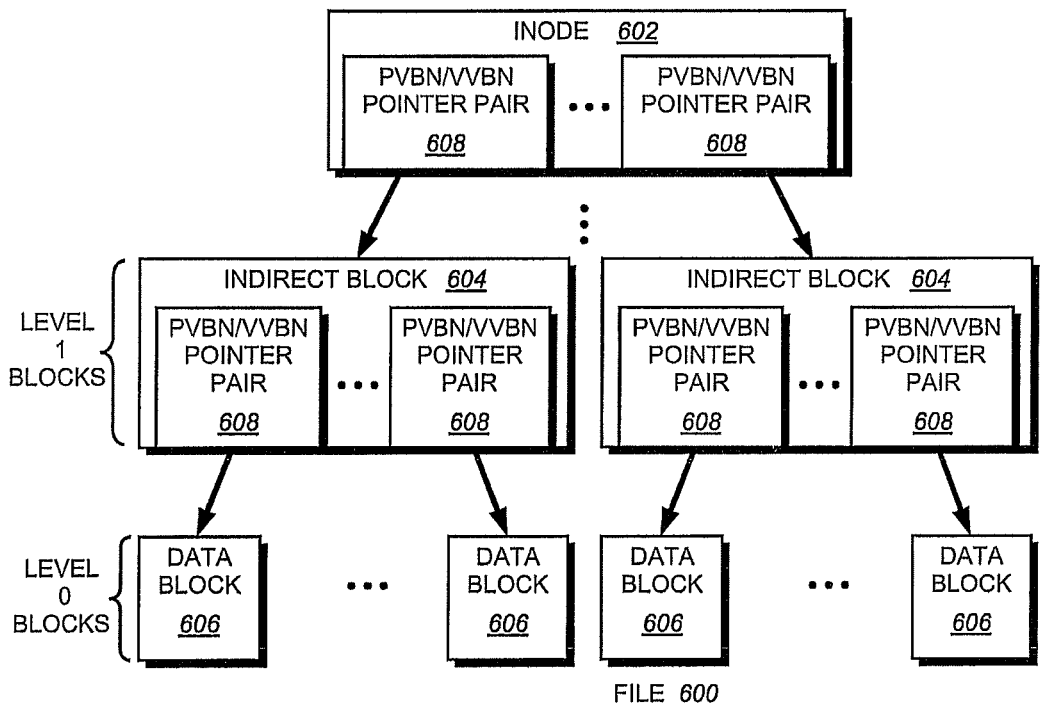
FIG. 6 is a schematic block diagram of a buffer tree of a file that may be advantageously used with an illustrative embodiment of the present invention.

In an illustrative dual vbn hybrid embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 6 is a schematic block diagram of an illustrative embodiment of a buffer tree of a file 600 that may be advantageously used with the present invention. A root (top-level) Mode 602, such as an embedded Mode, references indirect (e.g., level 1) blocks 604. Note that there may be additional levels of indirect blocks (e.g., level 2, level 3) depending upon the size of the file. The indirect blocks (and Mode) contain pvbn/vvbn pointer pair structures 608 that ultimately reference data blocks 606 used to store the actual data of the file.

The pvbns reference locations on disks of the aggregate, whereas the vvbns reference locations within files of the flexible volume. The use of pvbns as block pointers 608 in the indirect blocks 604 provides efficiencies in the read paths, while the use of vvbn block pointers provides efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 7:
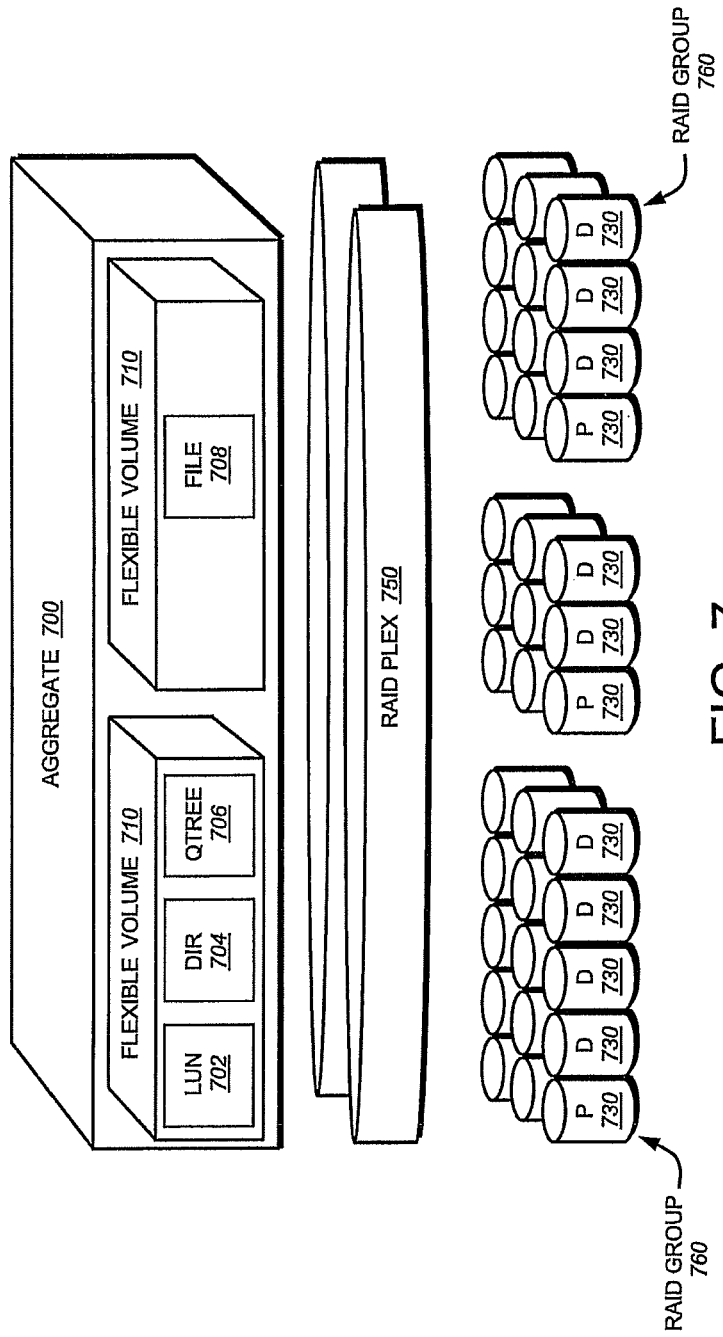
FIG. 7 is a schematic block diagram of an exemplary aggregate in accordance with an illustrative embodiment of the present invention.

FIG. 7 is a schematic block diagram of an embodiment of an aggregate 700 that may be advantageously used in accordance with an illustrative embodiment of the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and at least one (P) parity disk.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains metadata similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 8:
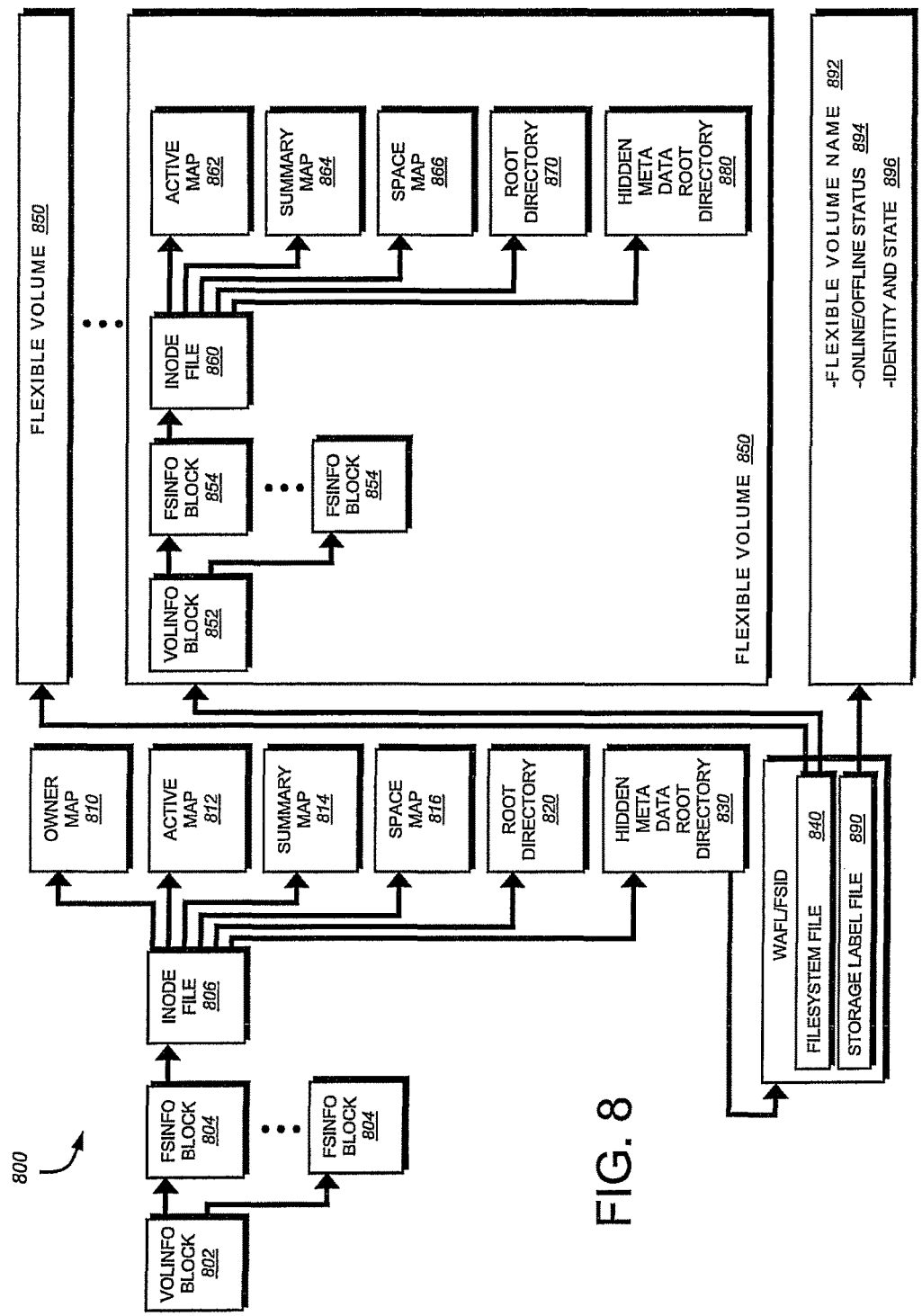
FIG. 8 is a schematic block diagram of an exemplary on-disk layout of an aggregate in accordance with an illustrative embodiment of the present invention.

FIG. 8 is a schematic block diagram of an on-disk representation of an aggregate 800 in accordance with an illustrative embodiment of the present invention. The storage operating system 300, e.g., the RAID system 380, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. Each fsinfo block 804 includes a block pointer to an inode file 806 that contains inodes of a plurality of files, including an owner map 810, an active map 812, a summary map 814 and a space map 816, as well as other special metadata files. The inode file 806 further includes a root directory 820 and a "hidden" metadata root directory 830, the latter of which includes a namespace having files related to a flexible volume in which users cannot "see" the files. The hidden metadata root directory includes the WAFL/fsid/directory structure that contains filesystem file 840 and storage label file 890. Note that root directory 820 in the aggregate is empty; all files related to the aggregate are organized within the hidden metadata root directory 830.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved inode numbers. Each flexible volume 850 also has special reserved inode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same inode file structure/content as the aggregate, with the exception that there is no owner map and no WAFL/fsid/filesystem file, storage label file directory structure in a hidden metadata root directory 880. To that end, each flexible volume 850 has a volinfo block 852 that points to one or more fsinfo blocks 854, each of which may represent a snapshot, along with the active file system of the flexible volume. Each fsinfo block, in turn, points to an inode file 860 that, as noted, has the same inode structure/content as the aggregate with the exceptions noted above. Each flexible volume 850 has its own inode file 1060 and distinct inode space with corresponding inode numbers, as well as its own root (fsid) directory 870 and subdirectories of files that can be exported separately from other flexible volumes.

The storage label file 890 contained within the hidden metadata root directory 830 of the aggregate is a small file that functions as an analog to a conventional raid label. A raid label includes physical information about the storage system, such as the volume name; that information is loaded into the storage label file 890. Illustratively, the storage label file 890 includes the name 892 of the associated flexible volume 850, the online/offline status 894 of the flexible volume, and other identity and state information 896 of the associated flexible volume (whether it is in the process of being created or destroyed).

F. VLDB

Figure 9:
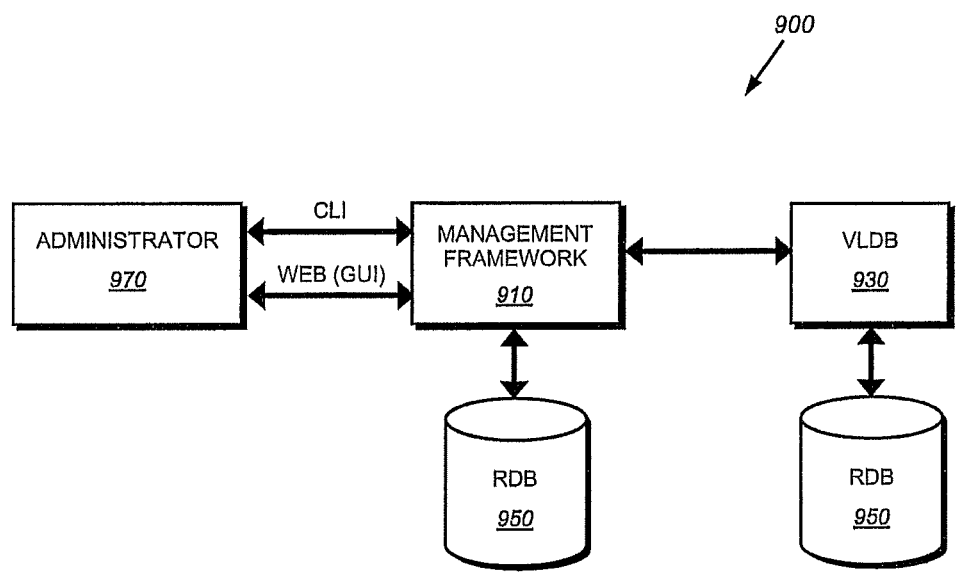
FIG. 9 is a schematic block diagram illustrating a collection of management processes in accordance with an illustrative embodiment of the present invention.

FIG. 9 is a schematic block diagram illustrating a collection of management processes illustratively embodied as applications 900 on the storage operating system 300 to provide management of configuration information (i.e. management data) for the nodes of the cluster in accordance with an illustrative embodiment of the present invention. To that end, the management processes include a management framework process 910 and a volume location database (VLDB) process 930, each utilizing a data replication service (RDB 950) linked as a library. The management framework 910 provides a user or an administrator 970 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 930 is a database process that tracks the locations of various storage components (e.g., SVSs, flexible volumes, aggregates, etc.) within the cluster 100 to thereby facilitate routing of requests throughout the cluster. In the illustrative embodiment, the network module 310 of each node accesses a configuration table 235 that maps certain contents of a data container handle 500 to a data module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1000 and a VLDB aggregate entry 1300.

Figure 10:
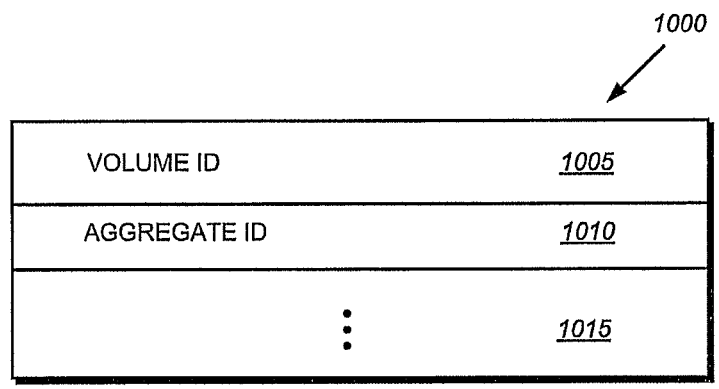
FIG. 10 is a schematic block diagram of a volume location database (VLDB) volume entry in accordance with an illustrative embodiment of the present invention.
Figure 11:
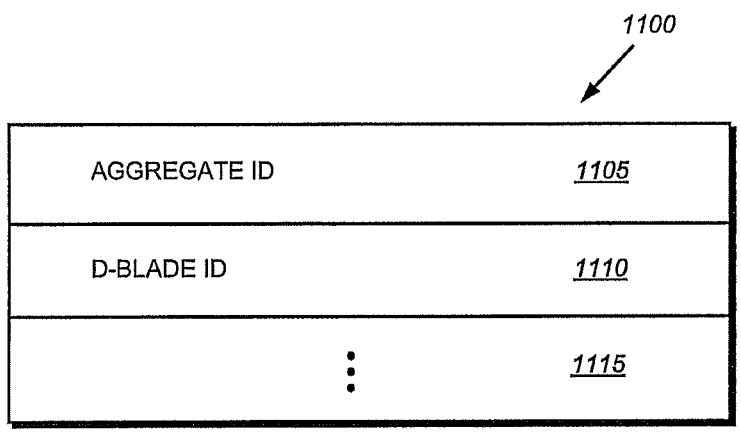
FIG. 11 is a schematic block diagram of a VLDB aggregate entry in accordance with an illustrative embodiment of the present invention.

FIG. 10 is a schematic block diagram of an exemplary VLDB volume entry 1000. The entry 1000 includes a volume ID field 1005, an aggregate ID field 1010 and, in alternate embodiments, additional fields 1015. The volume ID field 1005 contains an ID that identifies a volume 910 used in a volume location process. The aggregate ID field 1010 identifies the aggregate 900 containing the volume identified by the volume ID field 1005. Likewise, FIG. 11 is a schematic block diagram of an exemplary VLDB aggregate entry 1100. The entry 1100 includes an aggregate ID field 1105, a data module ID field 1110 and, in alternate embodiments, additional fields 1115. The aggregate ID field 1105 contains an ID of a particular aggregate 900 in the cluster 100. The data module ID field 1110 contains an ID of the data module hosting the particular aggregate identified by the aggregate ID field 1105.

The VLDB illustratively implements a RPC interface, e.g., a Sun RPC interface, which allows the network module 310 to query the VLDB 930. When encountering contents of a data container handle 500 that are not stored in its configuration table, the network module sends an RPC to the VLDB process. In response, the VLDB 930 returns to the network module the appropriate mapping information, including an ID of the data module that owns the data container. The network module caches the information in its configuration table 235 and uses is the data module ID to forward the incoming request to the appropriate data container. All functions and interactions between the network module 310 and data module 350 are coordinated on a cluster-wide basis through the collection of management processes and the RDB library user mode applications 900.

To that end, the management processes have interfaces to (are closely coupled to) RDB 950. The RDB comprises a library that provides a persistent object store (storing of objects) for the management data processed by the management processes. Notably, the RDB 950 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Shared Write Address Protocol

The present invention provides a system and method for a shared write address protocol (SWAP) that is implemented over a remote direct memory address (RDMA) connection. After the connection is established between two partner modules, e.g., a network element (network module) or disk element (data module), within a cluster utilizing a conventional RDMA transport protocol, each of the modules transmits a novel HELLO message to its partner. The HELLO message is utilized by each module to convey appropriate flow control information using a flow control data structure that is accessible to its partner via a RDMA READ operation. The novel protocol operates so that each module has one outstanding RDMA READ operation at a time, i.e., to obtain the current flow control information from its partner.

When a module receives data to be transmitted to its partner module over the RDMA connection, a determination is made whether the received data is less than or equal to a defined buffer size. The buffer size is illustratively defined in the initial HELLO messages exchanged between modules. If the data to be transmitted is less than or equal to the buffer size an INLINE message data structure of the SWAP protocol is utilized to send the data to the partner. However, if the data is greater than the buffer size, a second determination is made as to whether sufficient space exists in a message pool for the data. If insufficient space exists, the transmitting module waits until sufficient space exists before utilizing a novel WRITE operation of the SWAP protocol to transmit the data. By utilizing the principles of the present invention, the use of RDMA READ requests is limited to a single outstanding RDMA READ request to obtain flow control information from the module's partner, thereby obviating the need for having a plurality of outstanding RDMA READ operations for a single connection at a single time.

In accordance with an illustrative embodiment of the present invention, the shared write address protocol comprises a plurality of data structures (e.g., header, message descriptor) having various formats for conveying information to thereby improve throughput over RDMA connections while limiting the number of RDMA READ operations required by the protocol. Illustratively, a single RDMA READ operation is utilized to periodically obtain a copy of the partner's flow control block. In an illustrative embodiment, the RDMA READ operation may be schedule when the local node's free resource count falls below a predefined threshold. In alternative embodiments, the RDMA READ operation may be issued when the local node has exhausted all of the resources it has available. In further alternative embodiments additional and/or differing scheduling techniques may be utilized to determine when to initiate the RDMA READ operations. It should be understood that the various protocol formats described herein should be taken as exemplary only. As can be appreciated by one skilled in the art, various modifications, additions, and/or subtractions of the various fields, etc. to the protocol data structures may be accomplished without departing from the spirit or scope of the present invention. As such, the below defined protocol data structures are to be taken as exemplary only.

Figure 12:
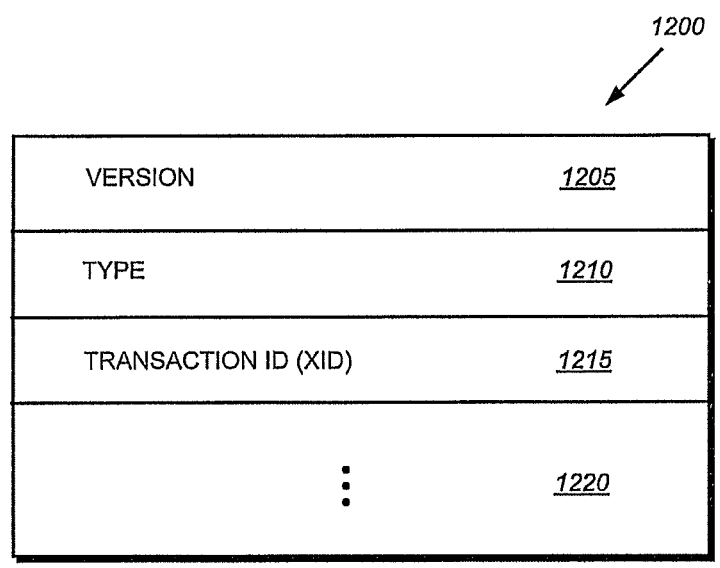
FIG. 12 is a schematic block diagram of a common shared write access protocol (SWAP) header data structure in accordance with an illustrative embodiment of the present invention.

FIG. 12 is a schematic block diagram of an exemplary SWAP common header data structure 1200 in accordance with an illustrative embodiment of the present invention. The common header data structure 1200 illustratively includes a version field 1205, a type field 1210, a transaction ID (XID) field 1215 and, in alternative embodiments, additional fields 1220. The version field 1205 contains a version of the SWAP protocol utilized by the transmitter (sender) of the common header data structure 1200. In alternative embodiments, systems may utilize slightly differing versions of the SWAP protocol. By transmitting the version value within version field 1205, recipients may properly parse received data structures stored therewithin. The type field 1210 identifies the type of message being sent. This type may comprise, for example, a HELLO message, an INLINE message and/or a WRITE message. The XID field 1215 is utilized to track the number of outstanding messages for flow control purposes. As described above in conjunction with the flow control block 371, whenever a transaction is processed, its transaction ID is stored in the XID acknowledgment field 373. This informs the module's partner that all transactions up to, and including, that particular XID have been processed. As such, all resources, such as buffers, etc. associated with the acknowledged XID and all previous XIDs may be re-utilized for storage of the data, etc. Illustratively, the first XID on a connection is set at one and is incremented (e.g., by one) each time a given sender transmits a new request. However, in alternative embodiments, additional and/or differing techniques for assigning each transaction a unique identifier may be utilized. As such, the description of an incrementing XID should be taken as exemplary only.

Figure 13:
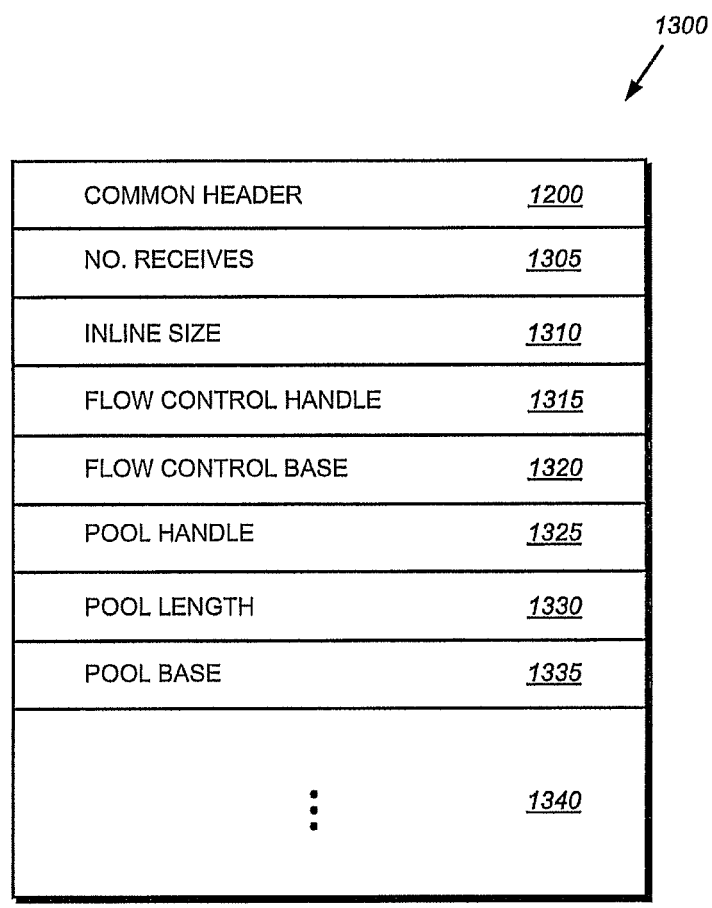
FIG. 13 is a schematic block diagram of an exemplary SWAP HELLO message data structure in accordance with an illustrative embodiment of the present invention.

FIG. 13 is a schematic block diagram of an exemplary HELLO message data structure 1300 in accordance with an illustrative embodiment of the present invention. The HELLO message data structure 1300 illustratively includes a common header data structure 1200, a number of receives field 1305, an INLINE size field 1310, a flow control handle field 1315, a flow control base field 1320, a pool handle field 1325, a pool length field 1330, a pool base field 1335 and, in alternative embodiments, additional fields 1340. The common header data structure 1200 is described above in relation to FIG. 12. The number of receives field 1305 signifies the number of receive buffers available for receipt of data by a particular module. The in-line size in field 1310 identifies the size of the INLINE buffers that will be posted by the HELLO message sender. The recipient sends INLINE messages that are less than or equal to the size specified by the INLINE size field 1310. Messages that are larger than the size are transmitted using the WRITE message, described further below. In an illustrative embodiment the INLINE value is set at 4 KB. However, in alternative embodiments differing values may be set. As such, the description of a 4 KB INLINE size should be taken as exemplary only. The flow control handle field 1315 is utilized along with the flow control base field 1320 to describe the location of the flow control block 371. The pool handle 1325 contains the handle for the message pool 270 into which WRITE messages can be deposited. The pool base and length fields 1335, 1330 identify a starting location base and a length of the message pool 270.

Figure 14:
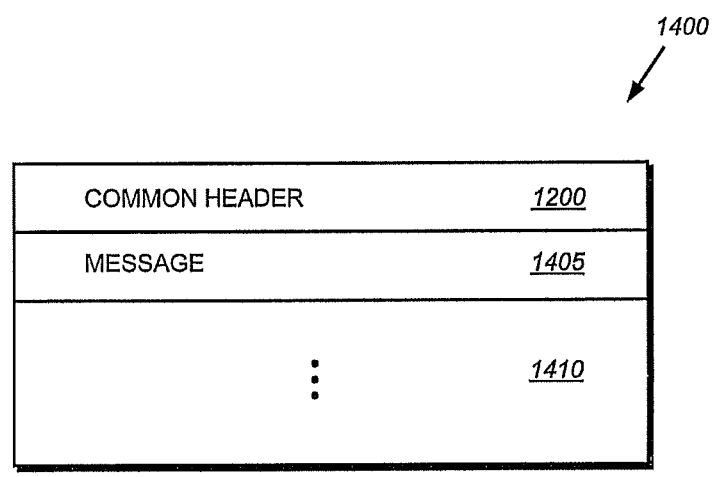
FIG. 14 is a schematic block diagram of an exemplary SWAP IN-LINE message data structure in accordance with an illustrative embodiment of the present invention.

FIG. 14 is a schematic block diagram of an exemplary SWAP INLINE message data structure 1400 in accordance with an illustrative embodiment of the present invention. The INLINE message data structure 1400 illustratively includes a common header data structure 1200, a message field 1405 and, in alternative embodiments, additional fields 1410. The common header data structure 1200 contains the common header, as described above in reference to FIG. 12. The message field 1405 contains the user data to be transmitted. Illustratively, the size of the message field 1405 is set by the INLINE size field 1310 within the original HELLO message data structure 1300 exchanged during initialization of a SWAP connection.

Figure 15:
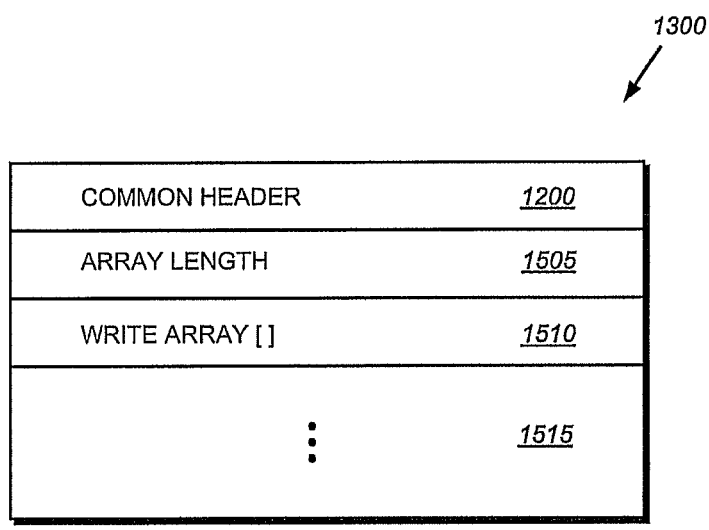
FIG. 15 is a schematic block diagram of an exemplary SWAP WRITE message structure in accordance with an illustrative embodiment of the present invention.

FIG. 15 is a schematic block diagram of an exemplary WRITE message data structure 1500 in accordance with an illustrative embodiment of the present invention. The WRITE data structure 1500 illustratively includes a common header data structure 1200, a write array length field 1505, a write array field 1510 and, in alternative embodiments, additional fields 1515. The common header data structure 1200 is described above in reference to FIG. 12. The array length field 1505 identifies the number of entries in the write array field 1510. Illustratively, each entry within the write array field comprises a write chunk descriptor 1600 described below in relation to FIG. 16.

Figure 16:
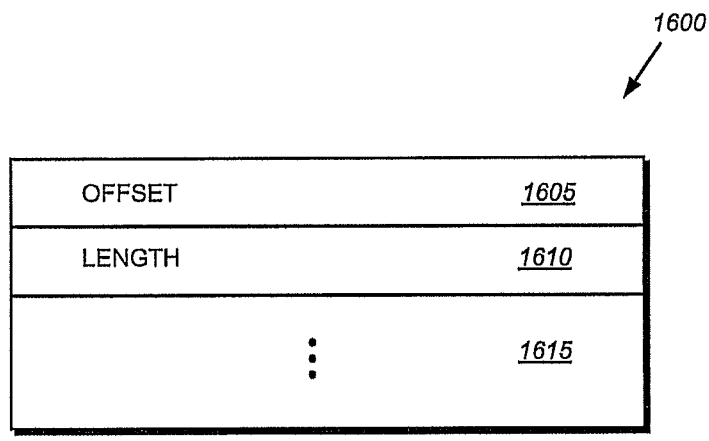
FIG. 16 is a schematic block diagram of a write chunk descriptor data structure in accordance with an illustrative embodiment of the present invention.

FIG. 16 is a schematic block diagram of an exemplary write chunk descriptor data structure 1600 in accordance with an illustrative embodiment of the present invention. The write chunk descriptor data structure 1600 comprises an offset field 1605, a length field 1610 and, in alternative embodiments, additional fields 1615. The offset field 1605 contains the offset from the base of the pool established in the HELLO message where the write chunk was placed. The length field 1610 is the length (in bytes) written in this write chunk.

Figure 17:
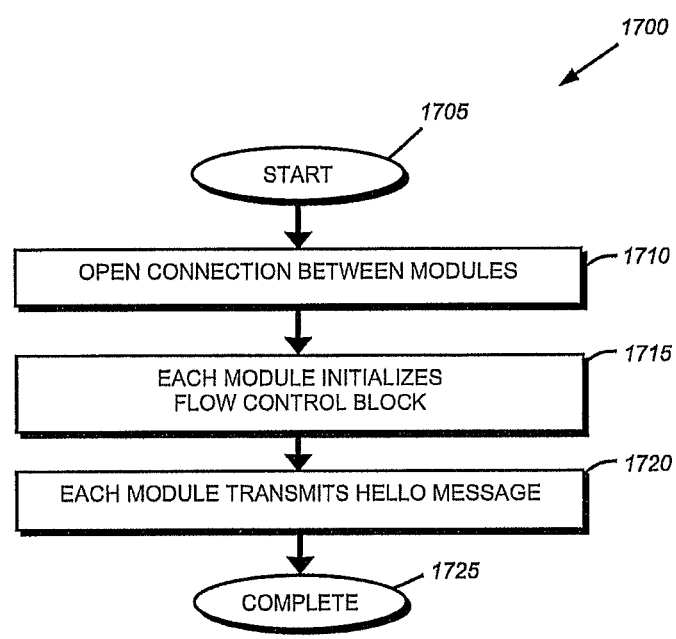
FIG. 17 is a flowchart detailing the steps of a procedure for initializing a SWAP connection in accordance with an illustrative embodiment of the present invention.

FIG. 17 is a flowchart detailing the steps of a procedure 1700 for initializing a remote direct memory access connection utilizing the SWAP protocol in accordance with an illustrative embodiment of the present invention. The procedure 1700 begins in step 1705 and continues to step 1710 where a connection is opened between two modules (e.g., a data module and an network module) utilizing a conventional remote direct memory access transport protocol, e.g., InfiniBand, etc. Each module initializes its appropriate flow control block in step 1720. The flow control block 371 may be initialized by, e.g., updating the appropriate fields within the flow control block and by reserving the appropriate memory for the flow control block. As the HELLO message contains certain information identifying the location of the flow control block each module to a connection will store the location of its partner's flow control block so that it can be retrieved at later times utilizing RDMA READ operations. Additionally, based on the contents of the HELLO message, each module knows the location and size of its partner's message pool 270. The module uses the location and size of the message pool along with the flow control information stored in the partner's flow control block, to implement the novel protocol and eliminate the need for a plurality of outstanding RDMA READ requests at any given time. Once the module has initialized its flow control block, each module then transmits a HELLO message to its partner in step 1715. The procedure 1700 then completes in step 1725.

Figure 18:
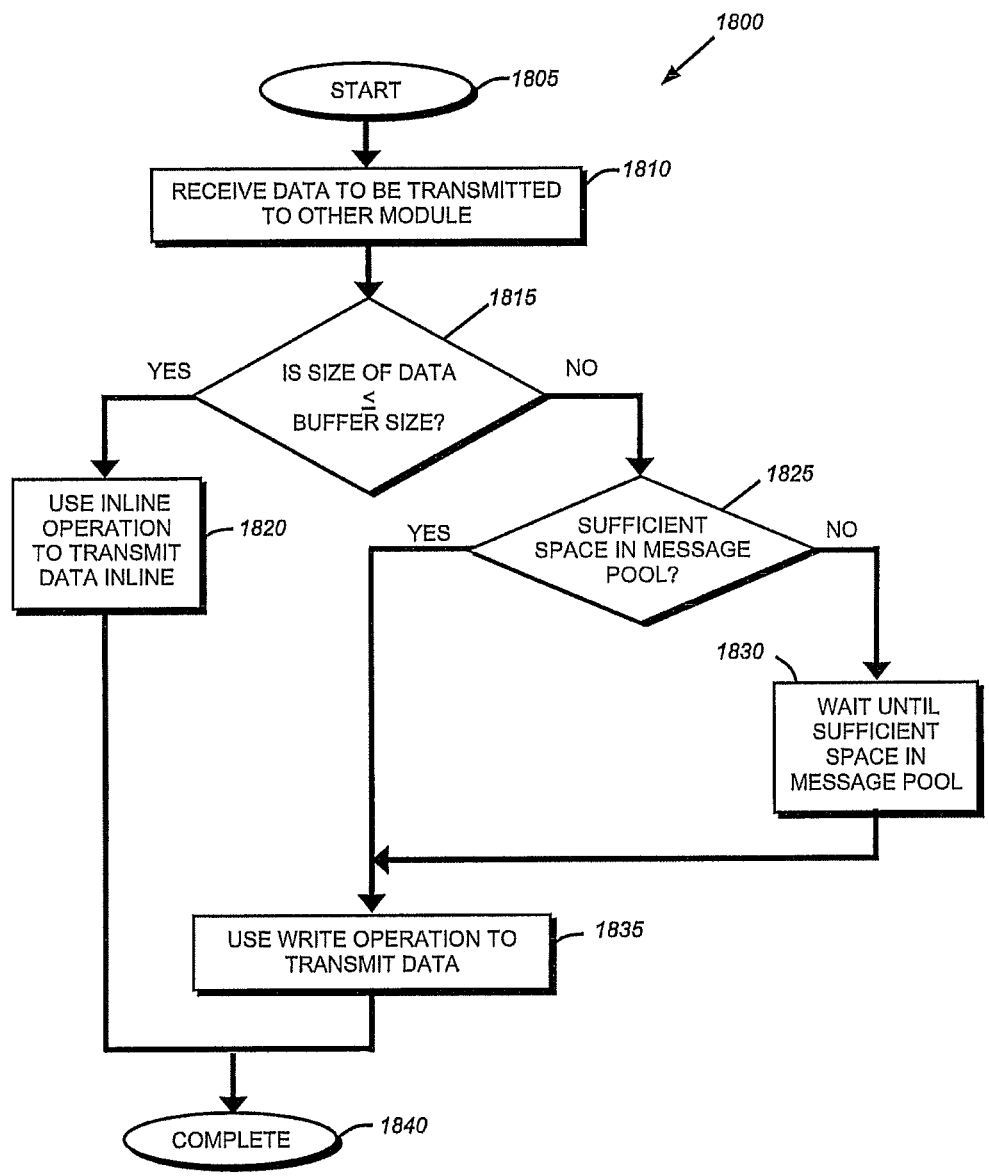
FIG. 18 is a flowchart detailing the steps of a procedure for processing messages using SWAP in accordance with an illustrative embodiment of the present invention.

FIG. 18 is a flowchart detailing the steps of a procedure 1800 for processing messages in accordance with an illustrative embodiment of the present invention. The procedure 1800 begins in step 1805 and continues to step 1810 where receive data to be transmitted one module to its partner module is received by the SWAP protocol module. Data may be received by the swap protocol module 371 via interprocess communication (IPC) or other forms of intra-computer communication. For example, the swap module 370 executing as part of the multiprotocol engine 325 may receive data to be transmitted from one of the protocol servers, such as the NFS protocol server 320. Similarly, the SWAP module 370 executing on the storage server may receive data from the file system 360 to be transmitted to the multiprotocol engine 325.

A determination is made, in step 1815, whether the size of the data to be transmitted is less than or equal to the previously set INLINE buffer size. As noted above, the INLINE message size is established during initialization of a SWAP connection. If the size of the data is less than or equal to the INLINE buffer size, the procedure branches to step 1820 where an INLINE operation is utilized to transmit the data. The procedure then completes in step 1840. When an INLINE operation is utilized, the data to be transmitted to the partner is stored within the INLINE data structure itself, thereby avoiding the need to allocate WRITE data structures, etc.

However, if in step 1815 it is determined that the size of data to be transmitted is greater than the INLINE buffer size, the procedure branches to step 1825 where a determination is made whether sufficient space exists in the message pool. By sufficient space it is meant generally, that the message pool has free space to store the data to be transmitted.

If insufficient space exists, the procedure branches the step 1830 and waits until sufficient space in the message pool exists. A determination of whether sufficient free space exists may be made by, e.g., issuing a READ operation to the flow control block of the partner. By examining the flow control block, the module may determine the last XID that was processed. All space within the message pool associated with the last XID (or any earlier XIDs) may be freed and reused. A WRITE operation is then utilized to transmit the data in step 1835. The procedure then completes in step 1840.

Upon processing received operations, a particular SWAP module 370 is configured to update the appropriate fields within the flow control block 371 to enable its partner to identify those buffers and other resources that may be re-utilized for further transactions.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In alternative embodiments, various processes and/or methods may be implemented by computer code. The various computer codes illustratively are implemented as a computer readable medium. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
issuing, by a computing device, a read operation to a flow control block of another computing device, via a remote direct memory access (RDMA) connection with the another computing device, to retrieve a transaction identifier of a last processed response of the another computing device;
determining, by the computing device, when sufficient space exists in a message pool on the another computing device to store data to be transmitted to the another computing device based on the retrieved transaction identifier and a size of the data; and
issuing, by the computing device, a write operation via the RDMA connection to transmit the data to the another computing device, when the determining indicates that sufficient space exists in the message pool on the another computing device to store the data.

2. The method of claim 1 further comprising
determining, by the computing device, when the size of data is less than or equal to an inline message size; and
transmitting, by the computing device, the data over the RDMA connection using an inline message data structure, when the determining indicates that the size of the data is less than or equal to the inline message size.

3. The method of claim 1 further comprising:
determining, by the computing device, when sufficient transactions have been processed by the another computing device to free an amount of space in the message pool greater than or equal to the size of the data, when the determining indicates that sufficient space does not exist in the message pool on the another computing device to store the data; and transmitting, by the computing device, the data to the another computing device, when the determining indicates that sufficient transactions have been processed by the second node to free an amount of space in the message pool greater than or equal to the size of the data.

4. The method of claim 1 further comprising receiving, by the computing device and from the another computing device, configuration information for the RDMA connection comprising at least a location of the flow control block.

5. A non-transitory machine readable medium having stored thereon instructions for performing a method comprising machine executable code which when executed by at least one machine, causes the machine to:
   issue a read operation to a flow control block of another computing device, via a remote direct memory access (RDMA) connection with the another computing device, to retrieve a transaction identifier of a last processed response of the another computing device;
   determine when sufficient space exists in a message pool on the another computing device to store data to be transmitted to the another computing device based on the retrieved transaction identifier and a size of the data; and
   issue a write operation via the RDMA connection to transmit the data to the another computing device, when the determining indicates that sufficient space exists in the message pool on the another computing device to store the data.

6. The non-transitory computer readable medium of claim 5 wherein the processor is further configured to execute the machine executable code to further cause the processor to:
   determine, by the computing device, when the size of data is less than or equal to an inline message size; and
   transmit the data over the RDMA connection using an inline message data structure, when the determining indicates that the size of the data is less than or equal to the inline message size.

7. The non-transitory computer readable medium of claim 5 wherein the processor is further configured to execute the machine executable code to further cause the processor to:
   determine when sufficient transactions have been processed by the another computing device to free an amount of space in the message pool greater than or equal to the size of the data, when the determining indicates that sufficient space does not exist in the message pool on the another computing device to store the data; and
   transmit the data to the another computing device, when the determining indicates that sufficient transactions have been processed by the second node to free an amount of space in the message pool greater than or equal to the size of the data.

8. The non-transitory computer readable medium of claim 5 wherein the machine executable code when executed by the machine further causes the machine to receive, from the another computing device, configuration information for the RDMA connection comprising at least a location of the flow control block.

9. A computing device comprising:
   a memory containing machine readable medium comprising machine executable code having stored thereon instructions for performing a method of optimizing communications over remote direct memory access (RDMA) connections; and
   a processor coupled to the memory, the processor configured to execute the machine executable code to cause the processor to:
      issue a read operation to a flow control block of another computing device, via an RDMA connection with the another computing device, to retrieve a transaction identifier of a last processed response of the another computing device;
      determine when sufficient space exists in a message pool on the another computing device to store data to be transmitted to the another computing device based on the retrieved transaction identifier and a size of the data; and
      issue a write operation via the RDMA connection to transmit the data to the another computing device, when the determining indicates that sufficient space exists in the message pool on the another computing device to store the data.

10. The computing device of claim 9, wherein the processor is further configured to execute the machine executable code to further cause the processor to:
    determine when the size of data is less than or equal to an inline message size; and
    transmit the data over the RDMA connection using an inline message data structure, when the determining indicates that the size of the data is less than or equal to the inline message size.

11. The computing device of claim 9, wherein the processor is further configured to execute the machine executable code to further cause the processor to:
    determine when sufficient transactions have been processed by the another computing device to free an amount of space in the message pool greater than or equal to the size of the data, when the determining indicates that sufficient space does not exist in the message pool on the another computing device to store the data; and
    transmit the data to the another computing device, when the determining indicates that sufficient transactions have been processed by the second node to free an amount of space in the message pool greater than or equal to the size of the data.

12. The computing device of claim 9, wherein the processor is further configured to execute the machine executable code to further cause the processor to receive, from the another computing device, configuration information for the RDMA connection comprising at least a location of the flow control block.

* * * * *